United States Patent [19]

Console et al.

[11] 3,940,368

[45] Feb. 24, 1976

[54] ACRYLONITRILE COPOLYMERS SUITABLE FOR MAKING FLAME-RESISTING FIBERS

[75] Inventors: Luciano Console, Mirano-Venice; Ferdinando Bencini, San Donato Milanese; Enzo Chiellini, Rosignano Solvay, all of Italy

[73] Assignee: Societa' Italiana Resine S.p.A., Milan, Italy

[22] Filed: Nov. 19, 1974

[21] Appl. No.: 525,141

[30] Foreign Application Priority Data
Nov. 28, 1973 Italy.................................. 31753/73

[52] U.S. Cl....... 260/63 HA; 260/80.76; 260/80.81; 260/79.3 M; 260/80.6; 260/29.6 AN; 260/29.6 T; 260/29.6 TA; 260/32.6 N; 260/31.8 AN; 260/31.8 Z; 260/33.4 R; 8/168 A; 8/168 AC

[51] Int. Cl.².............. C08F 214/10; C08F 220/44; C08F 216/14; C08F 220/46

[58] Field of Search......... 260/80.76, 80.77, 88.7 R, 260/63 HA, 80.6, 80.81, 79.3 M; 450/737

[56] References Cited
UNITED STATES PATENTS

| | | | |
|---|---|---|---|
| 3,379,699 | 4/1968 | Stroh............................. | 260/78.5 R |
| 3,426,104 | 2/1969 | Masson........................... | 260/80.76 |

*Primary Examiner*—Harry Wong, Jr.
*Assistant Examiner*—Maria S. Tungol
*Attorney, Agent, or Firm*—Sughrue, Rothwell, Mion, Zinn & Macpeak

[57] ABSTRACT

A copolymer suitable for making self-extinguishing fibers, containing at least 50 wt.% acrylonitrile, from 2 to 30 wt.% vinyl or vinylidene chloride, from 0 to 10 wt.% of a neutral, ethylenically unsaturated, non-halogenated monomer and from 2 to 40 wt.% of alpha-bromoacrylonitrile.

10 Claims, No Drawings

ACRYLONITRILE COPOLYMERS SUITABLE FOR MAKING FLAME-RESISTING FIBERS

The invention relates to novel copolymers containing acrylonitrile moieties, alphabromoacrylonitrile moieties and halogenated vinyl moieties.

In preparing copolymers suitable for conversion to fibers, acrylonitrile is usually copolymerized with minor quantities of a further ethylenically unsaturated monomer, such as vinyl acetate, methyl acrylate and styrene and, generally, also with small quantities of a copolymerizable, dyestuff acceptor monomer.

The resulting fibers can be dyed and exhibit a number of satisfactory properties but are not as flame-proof as would be required for various end uses, such as for articles of wear, blankets, carpets or the like.

In the prior art, the copolymers of acrylonitrile with the above-mentioned ethylenically unsaturated monomers are blended with polymers or copolymers of halogenated vinyl or vinylidene monomers such as those of vinyl or vinylidene chloride.

From these polymer blends improved fibers in respect of flame-proofness can be obtained but the fibers are of lower standard. It is believed that partial incompatibility between the blended polymers arises.

According to a further method known in the art, copolymers containing a halogen (chlorine or bromine) are converted to fibers, the said copolymers being obtained by copolymerizing a vinyl or vinylidene halogenated monomer with acrylonitrile and a further ethylenically unsaturated monomer mentioned hereinbefore.

This procedure suffers from various drawbacks because introduction of the vinyl or vinylidene halogenated monomers into the acrylonitrile copolymers detrimentally affects the properties of the fibers manufactured from the said copolymers. This drawback arises increasingly on increase in the halogenated vinyl or vinylidene moieties in the acrylonitrile copolymer or, in other words, the higher are the desired self-extinguishing properties. Thus, for instance, in the copolymerization of acrylonitrile with vinyl or vinylidene chloride and with the further ethylenically unsaturated monomers, copolymers unsuitable or hardly suitable for textile uses are generally obtained. The fibers produced from the said copolymers exhibit namely various undesirable properties, especially under the aspect of physical-mechanical characteristics and shrinkage in water at high temperature.

It has now been found that these drawbacks can be substantially reduced by the copolymers of the present invention which contain alpha-bromoacrylonitrile moieties together with acrylonitrile and halogenated vinyl or vinylidene moieties.

Thus, the invention provides a copolymer suitable for making self-extinguishing fibers comprising at least 50 wt.% acrylonitrile, from 2 to 30 wt.% vinyl or vinylidene chloride, from 0 to 10 wt.% of a neutral, ethylenically unsaturated, non-halogenated monomer and from 2 to 40 wt.% of alpha-bromo-acrylonitrile.

The receptivity of said copolymer towards basic dyestuffs can be improved by including therein in copolymerized form moieties of a monomer carrying sulphonic or, better, salified sulphonic groups.

The content of the copolymerized monomer carrying sulphonic groups in the final copolymer can range from 0.1 to 3.0% by weight.

According to the invention, alpha-bromoacrylonitrile is understood to define the compound of the formula

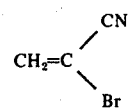

As neutral, ethylenically unsaturated, non halogenated monomers the compounds belonging to the following classes can be used: hydrocarbons, such as styrene and alpha-methylstyrene; ethers, such as vinyl methyl ether; ketones, such as vinyl methyl ketone; acrylates and methacrylates, such as methyl acrylate and methyl methacrylate, and vinyl esters, such as vinyl acetate. Among these compounds vinyl acetate, styrene and methyl acrylate are preferred.

the copolymerizable unsaturated monomer carrying sulphonic groups may be selected among the following compounds: methallyl sulphonic, styrene sulphonic, vinyl sulphonic, allyl oxyethyl sulphonic, methallyl oxyethyl sulphonic, allyl oxypropanol sulphonic, isopropenyl benzenesulphonic, vinyl methylbenzenesulphonic, vinyl ethylbenzenesulphonic, isopropenyl isopropylbenzene-sulphonic, vinyl hydroxybenzenesulphonic, vinyl dihydroxybenzenesulphonic, vinyl trihydroxybenzenesulphonic, vinyl hydroxynaphthalenesulphonic, isopropenyl naphthalene-sulphonic, allyl benzenesulphonic, methallyl benzenesulphonic, isopropenyl phenyl n-butanesulphonic, vinyl hydroxy-phenil methanesulphonic, vinyl trihydroxyphenyl ethane-sulphonic, isopropylethylenesulphonic, acetylethylenesulphonic, naphthyl-ethylenesulphonic, propenesulphonic, butenesulphonic, hexenesulphonic, methylpentenesulphonic, methylbutenesulphonic, triisobutylenesulphonic and diisobutylenesulphonic acids. These monomers are conveniently used in the form of alkali metal or ammonium salts.

The preferred monomers carrying sulphonic groups are: methallyl sulphonic, styrene sulphonic, methallyl oxyethyl sulphonic acids and sodium or potassium salts thereof.

The copolymers of the invention can be prepared by a wide range of conventional methods such as suspension, emulsion or solution polymerization.

The polymerization medium is preferably water; however, aqueous salt solutions or acid solutions are also useful. It is further possible to polymerize in specific solvents such as dimethylformamide, ethylene carbonate and dimethyl sulphoxide or in usual organic solvents such as benzene, heptane or alcohols.

In polymerization the monomers are mixed and contacted with one another by a discontinuous, semicontinuous or continuous method, in the presence of catalysts generating free radicals.

When operating in an aqueous medium the pH is usually maintained at a value from 2 to 5, the polymerization temperature varying depending upon the type and method of polymerization, a value of from 30° to 70°C being generally preferred.

Suitable catalysts are persulphuric acid, perboric acid and their alkali metal or ammonium salts; hydrogen peroxide, organic peroxides such as benzoyl peroxide, lauroyl peroxide, tert-butyl hydroperoxide; azo-compounds such as alpha-alpha'-azobisisobutyronitrile; catalysts of the reduction-oxidation type such as persulphates-bisulphites, chlorate-bisulphites, hydrogen peroxide-ferrous salts, permanganate-oxalic acid, benzoyl peroxide-dimethylaniline and further known catalysts for radicalic polymerization. If necessary, the polymerization medium can be admixed with molecular weight modifying agents, emulsifiers or dispersing agents.

The copolymers of the invention have a specific viscosity of from 0.1 to 0.4, the viscosity being determined by a visconsimeter of the Ubbelhode type by measuring the periods of flow through a capillary tube of known volumes of the solution containing 0.1 g copolymer to 100 ml dimethylformamide in comparison with dimethylformamide as such.

The said copolymers can be spun by a wet process, that is by extruding the copolymer dissolved in a suitable solvent into a coagulating bath consisting of a liquid which is inert and non-solvent for the copolymer.

To this end a solution can be employed containing 8 to 35% by weight copolymer in a solvent such as N,N-dimethyl-formamide, ethylene carbonate, N,N-dimethyl acetamide, dimethyl sulphoxide, or in a concentrated aqueous solution of sodium thiocyanate, zinc chloride or nitric acid.

The coagulating bath can consists of a mixture of water and solvent for the copolymer, such as a mixture of water and dimethylformamide or dimethyl acetamide. Relatively dilute aqueous solutions of salts, or hydrocarbons, or substances of alcoholic type can be employed as coagulating bath; the last mentioned substances can be employed in the form of an aqueous solution.

The formed filaments are drawn and washed, possibly submitted to heat treatment in a saturated steam atmosphere.

The use of alpha-bromoacrylonitrile in polymerization is advantageous thanks to its low volatility.

A fundamental advantage of the invention is the possibility of introducing into the copolymer large quantities of halogen in the form of halogenated moieties without detrimentally affecting the properties of the copolymer and fibers obtained therefrom. This is believed to be attributable to the properties of "affinity" of alphabromoacrylonitrile to the further monomers forming the copolymer.

Best results are obtained when the component moieties of the copolymer are within the following ranges by weight:
— acrylonitrile: at least 70%
— alpha-bromoacrylonitrile: 5 to 20%
— vinyl or vinylidene chloride: 10 to 25%
— the neutral, ethylenically unsaturated, non-halogenated monomer: 0 to 5%.

The fibers manufactured from the copolymers of the invention exhibit generally high properties which make them useful in the textile field. More particularly, the fibers are of excellent color, high physical-mechanical properties, heat and light proofness and dyeability; moreover their shrinkage in water at high temperature is within acceptable values.

In the following experimental examples the parts are to be understood by weight, unless otherwise specified.

Moreover, in said examples AN denotes acrylonitrile, ANB alpha-bromoacrylonitrile, VCl vinyl chloride and $VCl_2$ vinylidene chloride. These initials denote both the monomers as such and the corresponding monomer moieties in the copolymer.

EXAMPLE 1

A glass reactor provided with a stirrer, means for feeding the reactants and a thermostatic system is charged with 300 parts water; the latter is heated to 40°C while flushing by means of a nitrogen stream.

The reactor is gradually fed in 120 minutes with 60 parts AN monomer, 20 parts $VCl_2$ and 20 parts ANB.

At the same time the reactor is fed with a catalytic system consisting of a first solution obtained by dissolving 1.2 parts potassium persulphate in 100 parts water and a further solution obtained by dissolving in 135 parts water the following ingredients; 2 parts sodium bisulphite, 6 parts 1 N sulphuric acid and 2.5 parts of a solution containing 0.01 g/liter ferrous sulphate.

The two solutions forming the catalytic system are separately delivered to the reactor in which the temperature is constantly maintained at 40°C.

When delivery is terminated, the said temperature is maintained during further 30 minutes, whereupon 0.01 parts of the disodium salt of ethylenediaminetetra-acetic acid are added while cooling.

A white $AN/VCl_2/ANB$ copolymer is obtained, with a composition by weight of 77/15/8 and a specific viscosity of 0.18.

The recovered and dried copolymer is dissolved in dimethyl acetamide to a 20% concentration by weight.

Antimony sesquioxide is added to and dispersed in the resulting clear solution in a proportion amounting to 1.5 parts by weight to 100 parts by weight copolymer. The resulting mixture is extruded into a coagulating bath formed by dimethyl acetamide and water (50/50 by weight) kept at 50°C. The filaments are washed and drawn to five times their length in water at 98°C, then dried.

The filaments obtained are self-extinguishing when exposed to a flame and moreover exhibit satisfactory physical-mechanical and heat-resistance properties.

EXAMPLE 2

The procedure described in Example 1 is followed to prepare a number of copolymers which are converted to fibers.

The fibers are treated in saturated steam at various pressures, whereby shrinking is ascertained in comparison with fibers obtained from $AN/VCl_2$ and $AN/VCl$ copolymers.

Table 1 summarizes the results of tests (a) to (d); the tests (a) and (b) being comparative tests.

In the Table column (1) shows the moieties forming the copolymer, column (2) shows the weight ratio of the moieties, column (3) shows the percentage of shrinking after treatment of the fibers in saturated steam at 1.5 kg/sq.cm., and column (4) shows the percentage of shrinking after treatment of the fibers in saturated steam at 2.5 kg/sq.cm.

Table 1

|  | (1) | (2) | (3) | (4) |
|---|---|---|---|---|
| Test a) | $AN/VCl_2$ | 60/40 | 30 | 45 |
| Test b) | AN/VCl | 50/50 | 50 | 50 |
| Test c) | $AN/VCl_2/ANB$ | 75/10/15 | 20 | 28 |
| Test d) | $AN/VCl_2/ANB$ | 70/15/15 | 23 | 29 |

All examined samples are of a similar behaviour towards the flame.

The shrinkage values in saturated steam are further improved when moieties of at least one neutral, ethylenically unsaturated, non-halogenated monomer and possibly also of a copolymerizable monomer carrying sulphonic groups adapted to improve the dyeing aptitude of the filaments are introduced into the copolymer.

We claim:

1. A copolymer suitable for making self-extinguishing fibers, consisting essentially of at least 50 wt.% of acrylonitrile, from 2 to 30 wt.% of vinyl or vinylidene chloride, from 0 to 10 wt.% of a neutral, ethylenically unsaturated, non-halogenated monomer and from 2 to 40 wt.% of alpha-bromoacrylonitrile.

2. A copolymer suitable for making self-extinguishing fibers, consisting essentially of at least 70 wt.% of acrylonitrile, from 10 to 25 wt.% of vinyl or vinylidene chloride, from 0 to 5 wt.% of a neutral, ethylenically unsaturated, non-halogenated monomer and from 5 to 20 wt.% of alpha-bromoacrylonitrile.

3. A copolymer suitable for making self-extinguishing fibers, consisting essentially of at least 50 wt.% acrylonitrile, from 2 to 30 wt.% vinyl or vinylidene chloride, from 0 to 10 wt.% of a neutral, ethylenically unsaturated, non-halogenated monomer, from 2 to 40 wt.% of alpha-bromoacrylonitrile and from 0.1 to 3 wt.% of a copolymerized monomer carrying sulphonic groups.

4. A copolymer suitable for making self-extinguishing fibers, consisting essentially of at least 70 wt.% acrylonitrile, from 10 to 25 wt.% vinyl or vinylidene chloride, from 0 to 5 wt.% of a neutral, ethylenically unsaturated, non-halogenated monomer, from 5 to 20 wt.% of alpha-bromoacrylonitrile and from 0.1 to 3 wt.% of a copolymerized monomer carrying sulphonic groups.

5. The copolymer of claim 1, wherein the said neutral monomer is selected in the group consisting of styrene, alpha-methylstyrene, vinyl methyl ether, vinyl methyl ketone, methyl acrylate, methyl methacrylate and vinyl acetate.

6. The copolymer of claim 2, wherein the said neutral monomer is selected in the group consisting of styrene, alpha-methylstyrene, vinyl methyl ether, vinyl methyl ketone, methyl acrylate, methyl methacrylate and vinyl acetate.

7. The copolymer of claim 3, wherein the said neutral monomer is selected in the group consisting of styrene, alpha-methylstyrene, vinyl methyl ether, vinyl methyl ketone, methyl acrylate, methyl methacrylate and vinyl acetate.

8. The copolymer of claim 3, wherein the monomer carrying sulphonic groups is selected from the group consisting of methallyl sulphonic acid, styrene sulphonic acid, methallyl oxyethyl sulphonic acid and sodium and potassium salts of these acids.

9. The copolymer of claim 3, wherein the monomer carrying sulphonic groups is selected from the group consisting of methallyl sulphonic acid, styrene sulphonic acid, methallyl oxyethyl sulphonic acid and sodium and potassium salts of these acids.

10. The copolymer of claim 4, wherein the said neutral monomer is selected in the group consisting of styrene, alpha-methyl styrene, vinyl methyl ether, vinyl methyl ketone, methyl acrylate, methyl methacrylate and vinyl acetate.

* * * * *